US012614010B1

(12) United States Patent
Wang et al.

(10) Patent No.: US 12,614,010 B1
(45) Date of Patent: Apr. 28, 2026

(54) PURPOSE-DIRECTED CANDIDATE FILTERING FOR CRITICAL REGION RESYNTHESIS

(71) Applicant: Cadence Design Systems, Inc., San Jose, CA (US)

(72) Inventors: Zi Wang, Dallas, TX (US); Kwangsoo Han, Austin, TX (US); Jordan Moxon, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 675 days.

(21) Appl. No.: 18/106,356

(22) Filed: Feb. 6, 2023

(51) Int. Cl.
　　*G06F 30/3308*　　(2020.01)
　　*G06F 111/04*　　(2020.01)
　　*G06F 111/20*　　(2020.01)
　　*G06F 119/06*　　(2020.01)

(52) U.S. Cl.
　　CPC ...... *G06F 30/3308* (2020.01); *G06F 2111/04* (2020.01); *G06F 2111/20* (2020.01); *G06F 2119/06* (2020.01)

(58) Field of Classification Search
　　USPC ........................................................ 716/109
　　See application file for complete search history.

(56) References Cited

U.S. PATENT DOCUMENTS

2015/0269304 A1 * 9/2015 Zahn ..................... G06F 30/398
　　　　　　　　　　　　　　　　　　　　716/113

* cited by examiner

*Primary Examiner* — Bryce M Aisaka
(74) *Attorney, Agent, or Firm* — Schwegman Lundberg & Woessner, P.A.

(57) ABSTRACT

Aspects of the present disclosure address systems and methods for performing critical region resynthesis with purpose-directed candidate filtering. Data representing an integrated circuit design is accessed along with a threshold constraint defining a power consumption threshold. A first cell is selected from the integrated circuit design. A swapping candidate to evaluate for swapping with the first cell is selected. The swapping candidate comprises at least a second cell. The swapping candidate is evaluated based on a power consumption associated with the swapping candidate and the power consumption threshold. The first cell is swapped with the swapping candidate in the integrated circuit design based on a result of the evaluating. The data representing the integrated circuit design is updated based on the swapping of the first cell with the swapping candidate.

20 Claims, 5 Drawing Sheets

200

300

305 ACCESS INTEGRATED CIRCUIT (IC) DESIGN DATA

310 ACCESS POWER CONSUMPTION THRESHOLD

315 SELECT CELL FROM IC DESIGN

320 SELECT SWAPPING CANDIDATE

325 EVALUATE WHETHER TO SWAP CELL WITH SWAPPING CANDIDATE

N

330 DISCARD SWAPPING CANDIDATE

Y

335 SWAP CELL WITH SWAPPING CANDIDATE

340 UPDATE IC DESIGN DATA

345 GENERATE DESIGN LAYOUT

PURPOSE-DIRECTED CANDIDATE FILTERING FOR CRITICAL REGION RESYNTHESIS

TECHNICAL FIELD

The present disclosure generally relates to the technical field of integrated circuit (IC) design. In particular, the present disclosure addresses techniques for purpose-directed candidate filtering for critical region resynthesis (CRR).

BACKGROUND

An IC comprises multiple circuit components referred to as "cells" and connections between or among the cells. A cell typically includes several pins interconnected by wires to pins of one or more other cells.

Design engineers design ICs by transforming descriptions of the ICs into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and components of an IC. For instance, EDA tools commonly use rectilinear lines to represent the wire segments that interconnect cells. These tools also represent cells as geometric objects with varying shapes and sizes.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
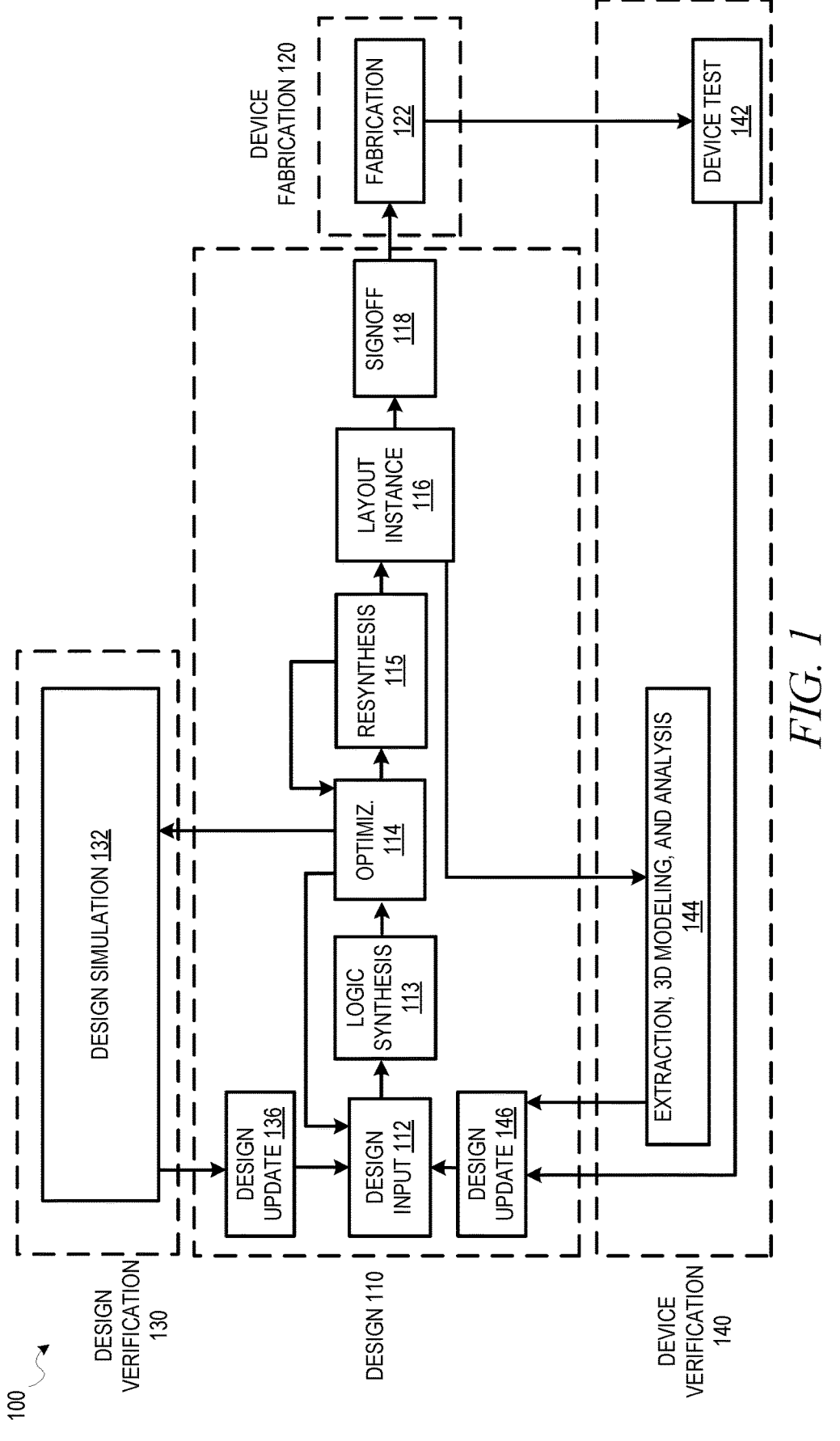
FIG. 1 is a diagram illustrating an example IC design flow that includes CRR with purpose-directed candidate filtering, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The EDA process for IC design entails various operations. A key operation in the EDA design flow is logic synthesis. During logic synthesis, an abstract specification of desired circuit behavior, typically in the form of a register transfer level (RTL) input file describing a plurality of Boolean logic equations, is translated into a representation of logic gates.

With conventional EDA flows, when a path fails a timing analysis after physical design, the flow returns to RTL operations to over-constrain the failing path and reperform placement. For some other typical EDA flows, rather than reverting to RTL operations, a set of gates from the failing path is aggressively restructured. With these EDA flows, generic gates are restructured in a post-placement timing environment and incremental placement, sizing, and buffering is performed. This process is referred to as "critical region resynthesis (CRR)" and as used herein, CRR refers to any restructuring of an arbitrary blob of logic for purposes of improving timing, power consumption, and area consumption.

Current CRR functionality in EDA flows include various candidate swapping operations based on different cost metrics. For example, CRR may include threshold voltage (VT) swapping during a timing optimization or node mapping during rectification. However, some of these swapping operations may not be desired under certain situations and for certain design purposes. For example, it may be undesirable to swap in a lower VT cell during CRR since this operations can be done through resizing in subsequent operations of the EDA flow. As another example, it may be undesirable to use an extremely low-leakage-power cell during rectification as greater dynamic power optimization is often the focus of CRR.

Aspects of the present disclosure address problems with conventional approaches to critical region resynthesis with an EDA system that performs purpose-directed candidate filtering for CRR. Consistent with some embodiments, a method performed by the EDA system (e.g., as part of a CRR operation) includes accessing data describing an IC design and accessing a threshold constraint. The threshold constraint defines a power consumption threshold (e.g., a leakage power threshold) for evaluating swapping candidates. The EDA system evaluates swapping candidates based on whether the swapping candidates satisfy the threshold constraint. That is, the EDA system evaluates swapping candidates based on a comparison of a power consumption (e.g., leakage power) associated with each swapping candidate and the power consumption threshold.

If the power consumption associated with a given swapping candidate exceeds the power consumption threshold, and at least one other swapping candidate satisfies the threshold constraint, the swapping candidate is discarded. In this way, the EDA system uses the threshold constraint as a filter for swapping candidates. The EDA system evaluates a filtered set of swapping candidates using a cost function that computes a cost of each swapping candidate based on a combination of area, power, and delay. The EDA system may select a swapping candidate for swapping out a cell in the IC design based on the swapping candidate having a lowest cost among the set of filtered swapping candidates.

If there are no swapping candidates for a given cell in the design that satisfy the threshold constraint, the EDA system calculates a severity of violation of the threshold constraint for each swapping candidate and selects the swapping candidate with the lowest severity of violation. The EDA system may calculate the severity of violation for a given swapping candidate based on the difference between the power consumption associated with the swapping candidate and the power consumption threshold.

By utilizing purpose-directed candidate filtering during CRR in this manner, the EDA system produces IC designs with improved power consumption characteristics than with traditional approaches to CRR.

FIG. 1 is a diagram illustrating an example IC design flow 100 that includes application of a logic sharing transformation, according to some embodiments. It will be understood that any one or more aspects of the IC design flow 100 may be performed by a computing device executing instructions of an EDA system. For instance, one or more portions of the IC design flow 100 may be represented by executable instructions (e.g., EDA software) that, when executed by a processor of a computing device, cause the computing device to the corresponding portion of the IC design flow 100. Thus, an operation of the design flow 100 may be performed by a hardware processor (e.g., central processing unit (CPU) or graphics processing unit (GPU)) of a computing device (e.g., desktop, server, etc.).

As shown, the EDA design flow 100 includes a design phase 110, a device fabrication phase 120, a design verification phase 130, and a device verification phase 140.

The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

For some embodiments, the design phase 110 includes a high-level synthesis operation that includes receiving a high-level description of an IC design (e.g., in C/C++; as part of the initial design input 112) and converting the high-level description to a RTL file that represents circuitry via the utilization of interaction between registers. For some embodiments, the RTL file is received as part of the initial design input 112.

As shown, the design phase 110 may further include logic synthesis 113. During logic synthesis 113, an RTL file, which describes a plurality of Boolean logic equations, is translated into a representation of a set of logic gates.

A timing analysis and one or more optimization operations may be performed with respect to the design at optimization(s) 114. As an example, these optimization(s) 114 can include resizing and buffering. While the design flow 100 shows the optimization(s) 114 occurring prior to CRR 115, the timing analysis and the optimization operation(s) may be performed or repeated at any time (e.g., to verify or improve operation of a circuit design). For instance, in various embodiments, timing analysis in a circuit design may be performed prior to, during, or as part of RTL operations (e.g., performed as part of logic synthesis 113), or as part of a signoff 118, as described below.

The design phase 110 may further include CRR 115. During CRR 115, one or more regions of the design (e.g., each comprising a set of logic gates) are aggressively restructured in a post-timing environment. The restructuring may include swapping a cell (e.g., a logic gate) in the design with one or more other cells that provide the same function. A purpose-directed candidate filtering approach may be employed in determining which cells to swap. Further details regarding the purpose-directed candidate filtering approach to swapping during CRR are discussed below.

After design inputs are used in the design input 112 operation to generate a circuit layout, and any of the logic synthesis 113 and the optimization(s) 114 are performed, a layout is generated (the layout instance 116). The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, further optimization(s) 114 may be performed.

Figure 2:
FIG. 2 is a diagram illustrating an example CRR process, according to some embodiments.
Figure 2:
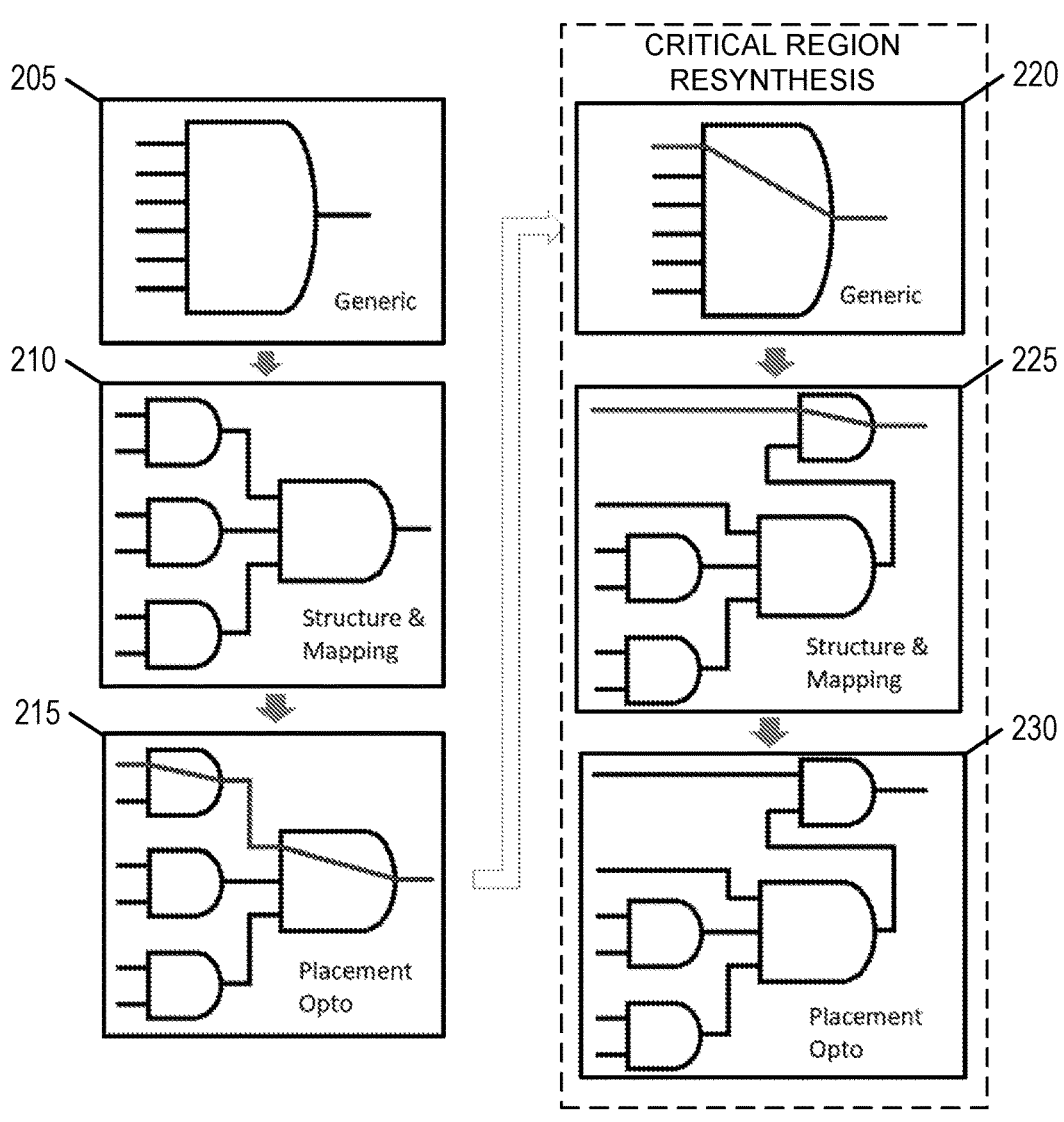

FIG. 2 is a diagram illustrating an example design process 200 in which CRR is performed, according to some embodiments. The design process 200 may be performed as part of the IC design flow 100. Hence, any one or more operations of the design process 200 may be performed by a computing device executing instructions of an EDA system. Accordingly, the design process 200 is described below in reference to the EDA system.

At 205, the EDA system reads in RTL data and converts the RTL data into a representation of generic gates. The representation of generic gates may include one or more gates that are not included in the EDA system's component library. The EDA system, at 210, performs structuring and mapping on the representation of generic gates to obtain actual library components. At 215, the EDA system performs placement and optimization, where sizing and buffering are performed. For example, a first NAND gate may be switched for second NAND gate with higher drive strength, or additional buffers may be added to a critical path.

With conventional IC design flows, a path that fails timing after physical design is returned to RTL to over-constrain the failing path so that synthesis produces a netlist with headroom on that path. Consistent with these conventional flows, placement is then repeated with the objective of having the failed path meet timing constraints.

Contrary to these conventional IC design flows, the example design process includes CRR process 215 that serves to eliminate distinctions between synthesis and placement. That is, instead of having to return to RTL, the EDA system can aggressively restructure a group of gates (e.g., a region). In performing the CRR, the EDA system returns to the representation of the generic gates (220), restructures the generic gates in a post-placement timing environment (225), and performs incremental placement, sizing, and buffering (230). As will be discussed in further detail below, the restructuring performed during the CRR process 215 can include swapping a cell (e.g., a logic gate) in the design with one or more other cells that provide the same logical function.

By performing the CRR process 215 in this manner, the EDA system significantly improves total negative slack in complex designs. The CRR process 215 also improves the run time for many designs that previously met timing. With the set of gates illustrated in FIG. 2, a generic AND gate is mapped (on the left), but one of the input signals is arriving late. This is not something that can be handled with resizing and buffering, but the region can be restructured (on the right) so that the late signal gets a special fast lane through the region so that it makes timing.

Figure 3:
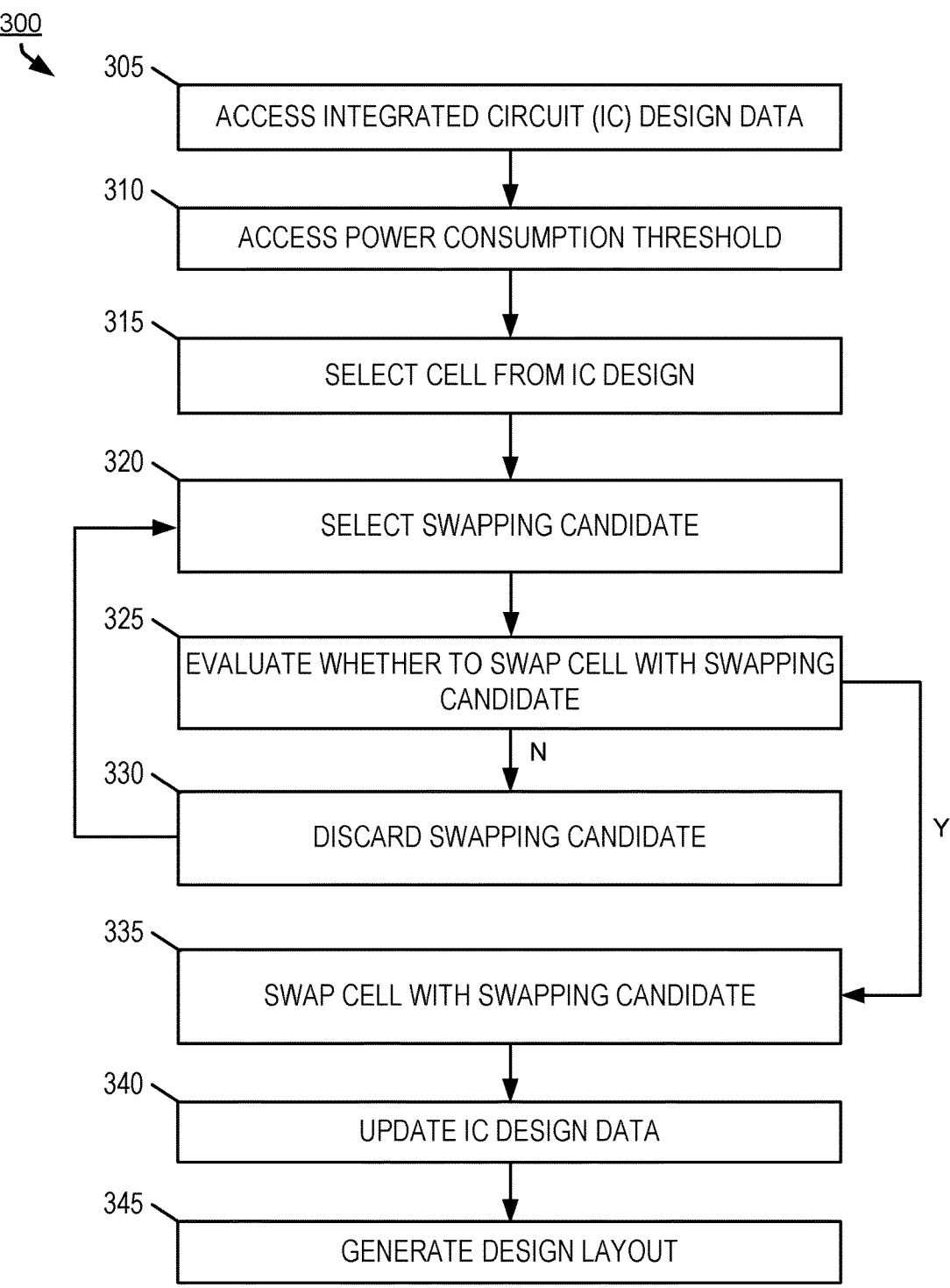
FIGS. 3 and 4 are flowcharts illustrating operations of a method for performing CRR with purpose-directed candidate filtering as part of an IC design flow, according to some example embodiments.
Figure 4:
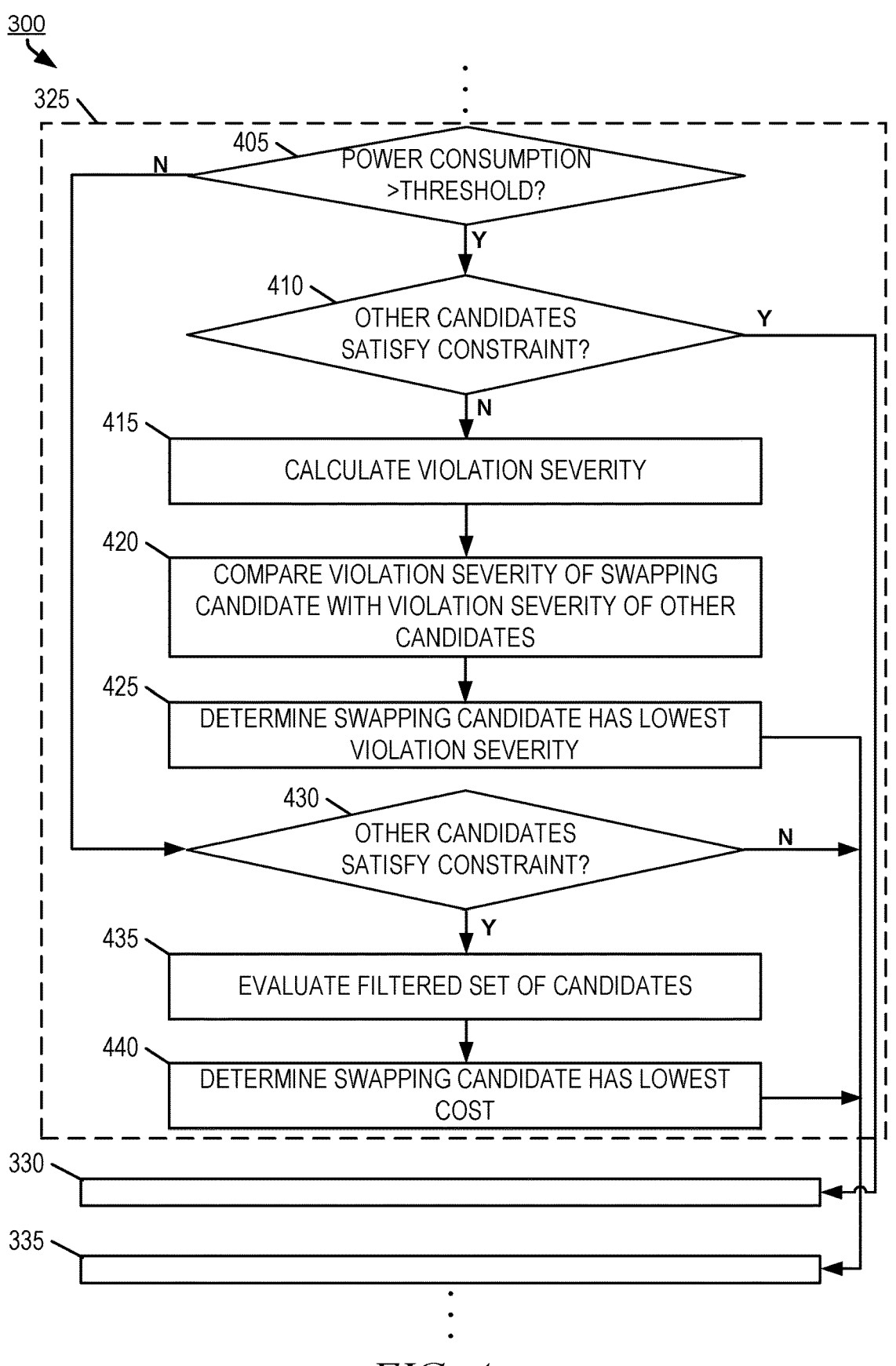

FIGS. 3 and 4 are flowcharts illustrating operations of a method 300 for performing CRR with purpose-directed candidate filtering as part of an IC design flow, according to some example embodiments. It will be understood that the method 300 may be performed by a device, such as a computing device executing instructions of an EDA software system. For instance, the operations of the method 300 may be represented by executable instructions (e.g., EDA software) that, when executed by a processor of a computing device, cause the computing device to perform the method 300. Thus, an operation of the method 300 may be performed by a hardware processor (e.g., CPU or GPU) of a computing device (e.g., desktop, server, etc.). Accordingly, the method 300 is described below with reference to such a computing device.

Depending on the embodiment, an operation of the method 300 may be repeated in different ways or involve intervening operations not shown. Though the operations of the method 300 may be depicted and described in a certain order, the order in which the operations are performed may vary among embodiments, including performing certain operations in parallel.

The method 300 as illustrated begins, at operation 305, where the computing device accesses data describing an IC design (also referred to herein as "IC design data") from memory. The IC design data can comprise or correspond to one or more IC design files stored in memory. The IC design data specifies a set of cells determined based on an initial logic synthesis process. During the initial logic synthesis, an abstract specification of desired circuit behavior (e.g., an RTL input file) describing a plurality of Boolean logic equations is translated into a representation of logic gates. Hence, the set of cells specified by the IC design include one or more logic gates that implement functional logic of the IC design.

At operation 310, the computing device accesses a power consumption threshold constraint defining a power consumption threshold associated with the IC design. The power consumption threshold may, for example, comprise a leakage power threshold. The power consumption threshold is used in filtering out swapping candidates for swapping transformations performed as part of the CRR process.

For some embodiments, the power consumption threshold constraint can be received from a user via a user interface provided by the computing device. For some embodiments, the power consumption threshold constraint can be a default value. The computing device can access the power consumption threshold constraint from the IC design data or another location in memory.

The computing device selects a first cell (e.g., a logic gate) from the set of cells of the IC design to evaluate for swapping, at operation 315. The computing device selects a swapping candidate (e.g., from a cell library) for the first cell, at operation 320. The swapping candidate may be selected from a set of swapping candidates that can be swapped with the first cell while providing the same logical function. The swapping candidate comprises at least a second cell that can be swapped with the first cell. In an example, the first cell is a first logic gate and the second cell is a second logic gate that is a different size than the first logic gate but implements the same functional logic. In some instances, the swapping candidate can include a configuration of multiple cells that can be swapped with the first cell.

At operation 325, the computing device evaluates whether to swap the first cell with the swapping candidate in the IC design based on a comparison of a power consumption associated with the swapping candidate and the power consumption threshold. For example, the computing device may compare a leakage power associated with the swapping candidate with a leakage power threshold.

The computing device may compute the power consumption for the swapping candidate (e.g., the leakage power associated with the swapping candidate) or access information such as a table that provides a mapping between swapping candidates and power consumption measurements. In evaluating the swapping candidate, the computing device determines whether the power consumption associated with the swapping candidate satisfies the power consumption threshold constraint.

Based on a negative result from the evaluation (e.g., based on the power consumption associated with the swapping candidate violating the power consumption threshold constraint), the computing device discards the swapping candidate, at operation 330, and the method 300 may return to the operation 320 where a new swapping candidate is selected.

Based on a positive result from the evaluation (e.g., based on the power consumption associated with the swapping candidate satisfying the power consumption threshold constraint), the computing device, at operation 335, swaps the first cell with the swapping candidate.

At operation 340, the computing device updates the IC design data to reflect swapping of the first cell with the swapping candidate. The computing device, at operation 345, generates a design layout instance for the IC device design based on the swapping of the first cell with the swapping candidate. The layout describes the physical layout dimensions of the IC device.

As shown in FIG. 4, the method 300 may, in some embodiments, further include operations 405, 410, 415, 420, 425, 430, 435, and 440. For some embodiments, the operations 405, 410, 415, 420, 425, 430, 435, and 440 are performed as part of operation 325 where the computing device evaluates the swapping candidate.

At operation 405, the computing device determines whether the power consumption associated with the swapping candidate satisfies the power consumption threshold constraint based on whether the power consumption associated with the swapping candidate exceeds the power consumption threshold. For example, the computing device may determine whether the leakage power associated with the swapping candidate exceeds a leakage power threshold.

If the power consumption associated with the swapping candidate violates the power consumption threshold constraint (e.g., if the power consumption exceeds the power consumption threshold), the computing device, at 410, determines whether there are any swapping candidates in a set of swapping candidates for the first cell that satisfy the power consumption threshold constraint. If there is at least one other swapping candidate that satisfies the power consumption threshold constraint, the result of the evaluation is negative and the method 300 moves to operation 330 where the swapping candidate is discarded.

If there are no other swapping candidates that satisfy the power consumption threshold constraint, the computing device calculates, at operation 415, a violation severity of the swapping candidate based on a difference between the power consumption associated with the swapping candidate and the power consumption threshold. That is, the difference between the power consumption associated with the swapping candidate and the power consumption threshold provides a measure of severity of the violation of the power consumption threshold constraint by the swapping candidate. At operation 420, the computing device compares the violation severity calculated for the swapping candidate with respective violation severities calculated for other swapping candidates in the set of swapping candidates. Based on the comparison, the computing device determines if the swapping candidate has the lowest violation severity among the set of swapping candidates, at operation 425. Based on determining the swapping candidate has the lowest violation severity among the set of swapping candidates, the computing device opts to swap the first cell with the swapping candidate at operation 335.

With reference back to the operation 405, if the power consumption associated with the swapping candidate satisfies the power consumption threshold constraint (e.g., if the power consumption does not exceed the power consumption threshold), the computing device determines, at operation 430, whether there are any other swapping candidates in the set of swapping candidates that satisfy the power consumption threshold constraint. If there are no other swapping candidates that satisfy the power consumption threshold constraint, the computing device opts to swap the first cell with the swapping candidate, at operation 335.

If there is at least one other swapping candidate that satisfies the power consumption threshold constraint, the computing device evaluates a filtered set of swapping candidates using a cost function, at operation 435. The computing device determines the filtered set of swapping candidates based on the power consumption threshold constraint. That is, the computing device determines the filtered set of swapping candidates by removing one or more swapping candidates that do not satisfy the power consumption threshold constraint from the set of swapping candidates. In this way, each swapping candidate in the filtered set of swapping candidates satisfies the power consumption threshold constraint.

In evaluating the swapping candidates, the computing device uses the cost function to determine a cost associated with each swapping candidate. Using the cost function, the computing device determines the cost associated with a given swapping candidate based on a combination of power and area consumptions associated with the swapping candidate. For example, the computing device may calculate the cost associated with a swapping candidate as follows:

$$Cost = delay\_weight * (slack/std\_delay) + 100 * (area\_cost/std\_gate\_area) + drc\_cost + slew\_cost + mpw\_cost$$

Where delay_weight is a factor to balance the trade-off between timing and area, slack is the difference between an expected arrival time and the actual arrival time for a signal, std_delay is a factor used to normalize slack, std_gate_area is the average area of gates in the library, drc_cost is the cost to evaluate the design rule checking, which includes constraints on slew, fanout, and capacitance, slew_cost is the cost to evaluate the rate of signal change, mpw_cost is the minimum pulse width cost, and area_cost is a combination of area and power consumption. In this example, area_cost can be determined as follow:

$$area\_cost = area (cell) + normalized\_power\_cost$$

where normalized_power_cost can be expressed as follows:

$$(power\_weight\_pct/100) * (power\_cost(cell)/std\_gate\_power) * std\_gate\_area$$

where power_weight_pct is a percentage value to indicate an importance of power when evaluating cost, power_cost(cell) is the power consumption of each cell, which includes dynamic power and leakage power, std_gate_power is a factor to transform power to the number of gates in view of the average power per gate, and std_gate_area is the average area of gates in the library.

At operation 440, the computing device determines the swapping candidate has the lowest cost among swapping candidates in the set of swapping candidates. Based on determining the swapping candidate has the lowest cost among swapping candidates in the set of swapping candidates, the computing device opts to swap the first cell with the swapping candidate at operation 335.

Figure 5:
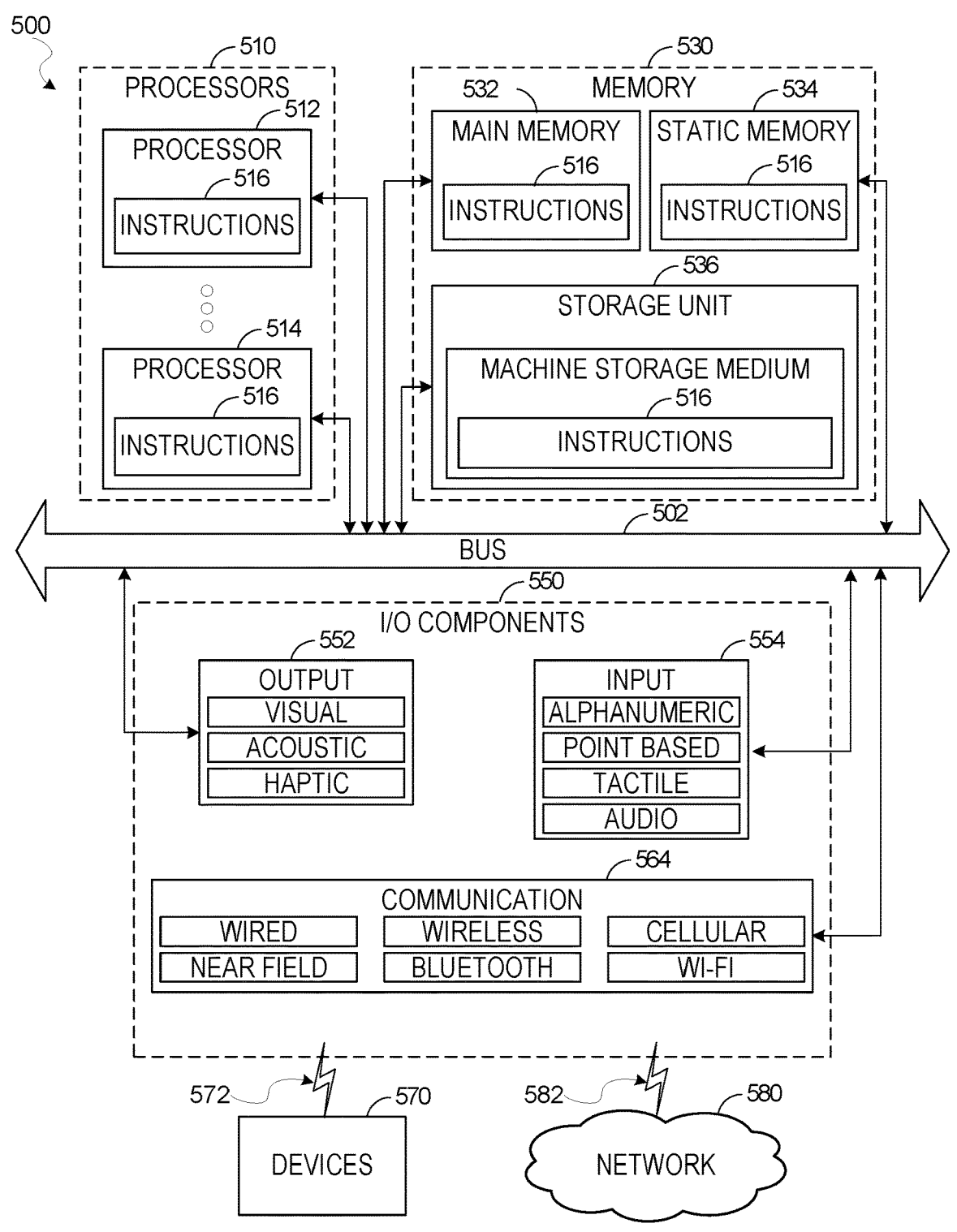
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute an EDA software system that executes the method 300. Additionally, or alternatively, the instructions 516 may implement the design flow 100 of FIG. 1. The instructions 516 transform the general, non-programmed machine 500 into a particular machine 500 programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a CPU, a reduced instruction set computing (RISC) processor, a complex instruction set computing (CISC) processor, a GPU, a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components (NFC, Bluetooth, and Wi-Fi) to provide communication via other modalities. The devices 570 may be another machine or any of a wide variety of peripheral devices (e.g., a peripheral device coupled via a universal serial bus (USB)).

Executable Instructions and Machine-Storage Medium

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the machine, cause the machine to perform operations comprising:
accessing, from memory, data representing an integrated circuit design;
accessing a threshold constraint defining a power consumption threshold;
selecting a first cell from the integrated circuit design;
selecting, from a cell library, a swapping candidate to evaluate for swapping with the first cell, the swapping candidate comprising at least a second cell;
evaluating whether to swap the first cell with the swapping candidate based on a comparison of a power consumption associated with the swapping candidate and the power consumption threshold, the evaluating comprising:
determining the power consumption associated with the swapping candidate exceeds the power consumption threshold;
based on determining the power consumption associated with the swapping candidate exceeds the power consumption threshold, calculating a difference between the power consumption associated with the swapping candidate and the power consumption threshold; and
opting to swap the first cell with the swapping candidate based on the difference; and
swapping the first cell with the swapping candidate in the integrated circuit design based on the evaluating; and
updating the data representing the integrated circuit design based on the swapping of the first cell with the swapping candidate.

2. The system of claim 1, further comprising receiving user input defining the threshold constraint.

3. The system of claim 1, wherein:
the swapping candidate is a first swapping candidate; and
the operations further comprise:
selecting a third cell from the integrated design;
selecting a second swapping candidate comprising at least a fourth cell;
determining a power consumption associated with the second swapping candidate exceeds the power consumption threshold; and

discarding the second swapping candidate based on determining the power consumption associated with the second swapping candidate exceeds the power consumption threshold.

4. The system of claim 1, wherein:

the swapping candidate is a first swapping candidate; and the operations further comprise:

selecting a third cell from the integrated design;

selecting a second swapping candidate comprising at least a fourth cell;

evaluating whether to swap the third cell with the second swapping candidate, the evaluating comprising determining the power consumption associated with the second swapping candidate does not exceed the power consumption threshold.

5. The system of claim 4, wherein evaluating whether to swap the third cell with the second swapping candidate further comprises:

evaluating a filtered set of swapping candidates using a cost function; and determining, based on the cost function, the second swapping candidate has a lowest cost among the set of swapping candidates.

6. The system of claim 5, wherein evaluating the filtered set of swapping candidates using the cost function comprises determining a cost associated with the second swapping candidate based on a combination of area and power consumption associated with the second swapping candidate.

7. The system of claim 5, wherein the operations further comprise:

determining the filtered set of swapping candidates from a set of swapping candidates based on the threshold constraint.

8. The system of claim 1, wherein the evaluating whether to swap the first cell with the swapping candidate further comprises determining the difference between the power consumption associated with the swapping candidate and the power consumption threshold is a lowest violation of the threshold constraint among a set of swapping candidates.

9. The system of claim 1, wherein the power consumption threshold comprises a leakage power threshold.

10. A method comprising:

accessing, from memory, data representing an integrated circuit design;

accessing a threshold constraint defining a power consumption threshold;

selecting a first cell from the integrated circuit design;

selecting, from a cell library, a swapping candidate to evaluate for swapping with the first cell, the swapping candidate comprising at least a second cell;

evaluating whether to swap the first cell with the swapping candidate based on a comparison of a power consumption associated with the swapping candidate and the power consumption threshold, the evaluating comprising:

determining the power consumption associated with the swapping candidate exceeds the power consumption threshold;

based on determining the power consumption associated with the swapping candidate exceeds the power consumption threshold, calculating a difference between the power consumption associated with the swa in candidate and the power consumption threshold, and opting to swap the first cell with the swapping candidate based on the difference;

swapping the first cell with the swapping candidate in the integrated circuit design based on the evaluating; and updating the data representing the integrated circuit design based on the swapping of the first cell with the swapping candidate.

11. The method of claim 10, further comprising receiving user input defining the threshold constraint.

12. The method of claim 10, wherein:

the swapping candidate is a first swapping candidate; and the method further comprising:

selecting a third cell from the integrated design;

selecting a second swapping candidate comprising at least a fourth cell;

determining a power consumption associated with the second swapping candidate exceeds the power consumption threshold; and discarding the second swapping candidate based on determining the power consumption associated with the second swapping candidate exceeds the power consumption threshold.

13. The method of claim 10, wherein:

the swapping candidate is a first swapping candidate; and the method further comprises:

selecting a third cell from the integrated design;

selecting a second swapping candidate comprising at least a fourth cell;

evaluating whether to swap the third cell with the second swapping candidate, the evaluating comprising determining the power consumption associated with the second swapping candidate does not exceed the power consumption threshold.

14. The method of claim 13, wherein evaluating whether to swap the third cell with the second swapping candidate further comprises:

evaluating a filtered set of swapping candidates using a cost function; and determining, based on the cost function, the second swapping candidate has a lowest cost among the set of swapping candidates.

15. The method of claim 14, wherein evaluating the filtered set of swapping candidates using the cost function comprises determining a cost associated with the second swapping candidate based on a combination of area and power consumption associated with the second swapping candidate.

16. The method of claim 14, further comprising:

determining the filtered set of swapping candidates from a set of swapping candidates based on the threshold constraint.

17. The method of claim 10, wherein the evaluating whether to swap the first cell with the swapping candidate further comprises determining the difference between the power consumption associated with the swapping candidate and the power consumption threshold is a lowest violation of the threshold constraint among a set of swapping candidates.

18. A computer storage medium storing instructions, which when executed by a machine, cause the machine to perform operations comprising:

accessing, from memory, data representing an integrated circuit design;

accessing a threshold constraint defining a power consumption threshold;

selecting a first cell from the integrated circuit design;

selecting, from a cell library, a swapping candidate to evaluate for swapping with the first cell, the swapping candidate comprising at least a second cell;

evaluating whether to swap the first cell with the swapping candidate based on a comparison of a power consumption associated with the swapping candidate and the power consumption threshold, the evaluating comprising:

determining the power consumption associated with the swapping candidate exceeds the power consumption threshold;

based on determining the power consumption associated with the swapping candidate exceeds the power consumption threshold, calculating a difference between the power consumption associated with the swapping candidate and the power consumption threshold; and opting to swap the first cell with the swapping candidate based on the difference;

swapping the first cell with the swapping candidate in the integrated circuit design based on the evaluating; and updating the data representing the integrated circuit design based on the swapping of the first cell with the swapping candidate.

19. The computer storage medium of claim 18, wherein the operations further comprise receiving user input defining the threshold constraint.

20. The computer storage medium of claim 18, wherein:

the swapping candidate is a first swapping candidate; and the operations further comprise:

selecting a third cell from the integrated design;

selecting a second swapping candidate comprising at least a fourth cell;

determining a power consumption associated with the second swapping candidate exceeds the power consumption threshold; and discarding the second swapping candidate based on determining the power consumption associated with the second swapping candidate exceeds the power consumption threshold.

* * * * *